US010936095B2

United States Patent
Kwon et al.

(10) Patent No.: US 10,936,095 B2
(45) Date of Patent: Mar. 2, 2021

(54) ELECTRONIC DEVICE FOR EXECUTING VARIOUS FUNCTIONS BASED ON SIGNAL RECEIVED FROM ELECTRIC PEN

(71) Applicant: Samsung Electronics Co., Ltd., Suwon-si (KR)

(72) Inventors: Zion Kwon, Suwon-si (KR); Heewoon Kim, Suwon-si (KR); Hyunmi Park, Suwon-si (KR); Hyewon Park, Suwon-si (KR); Chaewon Seo, Suwon-si (KR); Hyungdo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/352,188

(22) Filed: Mar. 13, 2019

(65) Prior Publication Data

US 2019/0286253 A1    Sep. 19, 2019

(30) Foreign Application Priority Data

Mar. 13, 2018   (KR) .................. 10-2018-0029212

(51) Int. Cl.
*G06F 3/038* (2013.01)
*G06F 3/0354* (2013.01)
*G06F 3/0481* (2013.01)
*G06F 3/0488* (2013.01)

(52) U.S. Cl.
CPC ........ *G06F 3/0383* (2013.01); *G06F 3/03545* (2013.01); *G06F 3/0488* (2013.01); *G06F 3/04817* (2013.01); *G06F 2203/0384* (2013.01); *G06F 2203/04807* (2013.01)

(58) Field of Classification Search
CPC ............... G06F 3/0383; G06F 3/03545; G06F 2203/04807
See application file for complete search history.

(56) References Cited

U.S. PATENT DOCUMENTS

| 2002/0148655 | A1 | 10/2002 | Cho et al. |
| 2014/0160045 | A1* | 6/2014 | Park .................... G06F 3/03545 345/173 |

(Continued)

FOREIGN PATENT DOCUMENTS

| EP | 3211509 A1 | 8/2017 |
| JP | 2016-110522 A | 6/2016 |

(Continued)

OTHER PUBLICATIONS

European Search Report dated Jul. 25, 2019, issued in European Application No. 19162578.9-1221.

*Primary Examiner* — Priyank J Shah
(74) *Attorney, Agent, or Firm* — Jefferson IP Law, LLP

(57) ABSTRACT

An electronic device is provided. The electronic device includes a display, a pen sensing panel disposed inside the display or on a rear surface of the display and receiving a first signal from an electronic pen through a first communication protocol, a communication circuit receiving a second signal from the electronic pen through a second communication protocol, a memory storing at least one application, and a processor electrically connected to the display, the pen sensing panel, the communication circuit, and the memory.

19 Claims, 13 Drawing Sheets

(56) References Cited

U.S. PATENT DOCUMENTS

| | | | |
|---|---|---|---|
| 2014/0253465 A1* | 9/2014 | Hicks | G06F 3/0416 |
| | | | 345/173 |
| 2014/0253520 A1 | 9/2014 | Cueto et al. | |
| 2015/0002482 A1* | 1/2015 | Mercea | G06F 3/03545 |
| | | | 345/179 |
| 2015/0346946 A1* | 12/2015 | Kelso | G06F 3/0484 |
| | | | 715/763 |
| 2016/0103504 A1* | 4/2016 | Kang | G06F 3/04883 |
| | | | 345/173 |
| 2017/0083117 A1* | 3/2017 | Ha | H04L 63/18 |
| 2017/0192591 A1* | 7/2017 | Jang | G06F 3/03545 |
| 2017/0322642 A1 | 11/2017 | Zhang et al. | |
| 2018/0024653 A1* | 1/2018 | Attarian | G06F 3/03545 |
| | | | 345/179 |
| 2018/0120962 A1* | 5/2018 | Hara | G06F 3/044 |
| 2018/0203559 A1* | 7/2018 | Choi | G06F 1/1605 |

FOREIGN PATENT DOCUMENTS

| | | |
|---|---|---|
| KR | 2002-0080171 A | 10/2002 |
| KR | 10-2010-0024205 A | 3/2010 |

* cited by examiner

ELECTRONIC DEVICE FOR EXECUTING VARIOUS FUNCTIONS BASED ON SIGNAL RECEIVED FROM ELECTRIC PEN

CROSS-REFERENCE TO RELATED APPLICATION(S)

This application is based on and claims priority under 35 U.S.C. § 119(a) to Korean patent application number 10-2018-0029212, filed on Mar. 13, 2018, in the Korean Intellectual Property Office, the disclosure of which is incorporated by reference herein its entirety.

BACKGROUND

1. Field

The disclosure relates to a technology for performing various functions using an electronic pen.

2. Description of Related Art

Recently, with the spread of electronic devices, the technology for entering data into the electronic devices has been actively developed. For example, via an electronic pen, a user may write a note directly on a display or may draw a picture. Furthermore, the user may execute a specific function by pressing a button mounted on the electronic pen.

The above information is presented as background information only to assist with an understanding of the disclosure. No determination has been made, and no assertion is made, as to whether any of the above might be applicable as prior art with regard to the disclosure.

SUMMARY

However, a user may not execute various functions of the electronic device by using an electronic pen, due to the limitation on a space for mounting the various parts in the electronic pen. For example, when the user presses a button mounted on the electronic pen, an electronic device may only execute a specific function mapped to the button, but may not execute other functions. As a result, the utilization of the electronic pen may be reduced, and the user may not utilize the electronic pen.

Aspects of the disclosure are to address at least the above-mentioned problems and/or disadvantages and to provide at least the advantages described below. Accordingly, an aspect of the disclosure is to provide an electronic device for solving the above-described problem and problems brought up in this specification.

Additional aspects will be set forth in part in the description which follows and, in part, will be apparent from the description, or may be learned by practice of the presented embodiments.

In accordance with an aspect of the disclosure, an electronic device is provided. The electronic device includes a display, a pen sensing panel disposed inside the display or on a rear surface of the display and receiving a first signal from an electronic pen through a first communication protocol, a communication circuit receiving a second signal from the electronic pen through a second communication protocol, a memory storing at least one application, and a processor electrically connected to the display, the pen sensing panel, the communication circuit, and the memory. The processor may be configured to execute the at least one application in response to a user input, when the first signal is received through the pen sensing panel while the at least one application is displayed through the display, to execute a function defined independently of the at least one application, and when the first signal is not received through the pen sensing panel but the second signal is received through the communication circuit while the at least one application is displayed through the display, to execute a function supported by the at least one application.

In accordance with another aspect of the disclosure, an electronic device is provided. The electronic device includes a display, a pen sensing panel disposed inside the display or on a rear surface of the display and sensing whether an electronic pen is located in a first region, a communication circuit detecting whether the electronic pen is located in a second region, which includes the first region and a remaining region which is greater than the first region, a memory storing at least one application, and a processor electrically connected to the display, the pen sensing panel, the communication circuit, and the memory. The processor may be configured to execute the at least one application in response to a user input, when the electronic pen is located in the first region, to display a first icon for executing a function defined independently of the at least one application, on the display, and when the electronic pen is located the remaining region, to display a second icon for executing a function supported by the at least one application, on the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
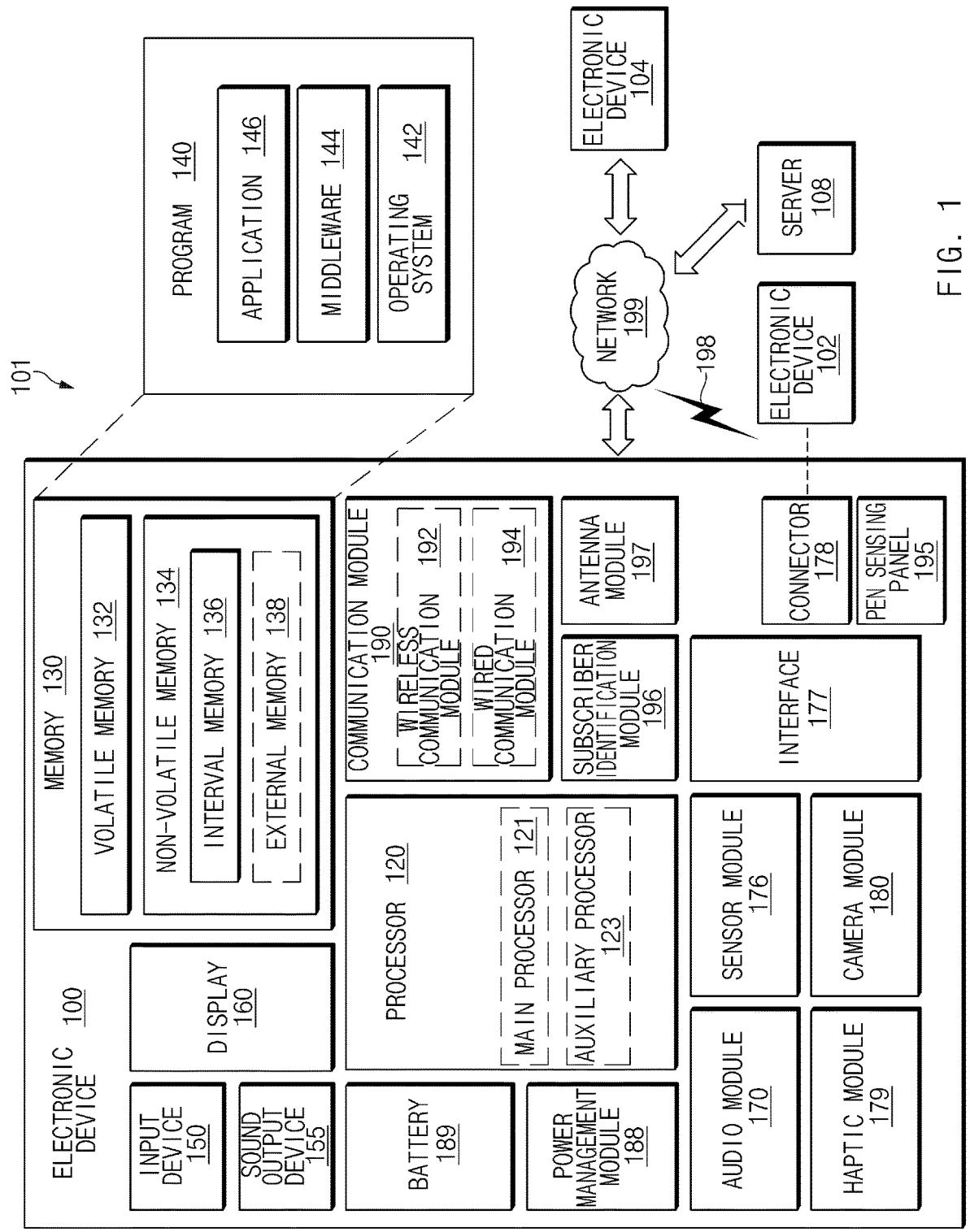
FIG. 1 is a block diagram of an electronic device in a network environment, according to various embodiments of the disclosure.

FIG. 1 is a block diagram of an electronic device in a network environment according to various embodiments of the disclosure.

Referring to FIG. 1, an electronic device 100 may communicate with an electronic device 102 through a first network 198 (e.g., a short-range wireless communication) or may communicate with an electronic device 104 or a server 108 through a second network 199 (e.g., a long-distance wireless communication) in a network environment 101. According to an embodiment, the electronic device 100 may communicate with the electronic device 104 through the server 108. According to an embodiment, the electronic device 100 may include a processor 120, a memory 130, an input device 150, a sound output device 155, a display 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display 160 or the camera module 180) among components of the electronic device 100 may be omitted or other components may be added to the electronic device 100. According to some embodiments, some components may be integrated and implemented as in the case of the sensor module 176 (e.g., a fingerprint sensor, an iris sensor, or an illuminance sensor) embedded in the display 160 (e.g., a display).

The processor 120 may operate, for example, software (e.g., a program 140) to control at least one of other components (e.g., a hardware or software component) of the electronic device 100 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or may be embedded therewith.

In this case, the auxiliary processor 123 may control, for example, at least some of functions or states associated with at least one component (e.g., the display 160, the sensor module 176, or the communication module 190) among the components of the electronic device 100 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 100, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 100, from an outside (e.g., a user) of the electronic device 100 and may include, for example, a microphone, a mouse, or a keyboard.

The sound output device 155 may be a device for outputting a sound signal to the outside of the electronic device 100 and may include, for example, a speaker used for general purposes, such as multimedia play or recordings play, and a receiver used only for receiving calls. According to an embodiment, the receiver and the speaker may be either integrally or separately implemented.

The display 160 may be a device for visually presenting information to the user of the electronic device 100 and may include, for example, a display, a hologram device, or a projector and a control circuit for controlling a corresponding device. According to an embodiment, the display 160 may include touch circuitry or a pressure sensor for measuring an intensity of pressure of the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 100.

The sensor module 176 may generate an electrical signal or a data value corresponding to an operating state (e.g., power or temperature) inside or an environmental state outside the electronic device 100. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, a high-definition multimedia interface (HDMI), a universal serial bus (USB) interface, a standard digital (SD) card interface, or an audio interface.

A connecting terminal 178 may include a connector that physically connects the electronic device 100 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 100 and may serve as at least a part of a power management integrated circuit (PMIC).

The battery 189 may be a device for supplying power to at least one component of the electronic device 100 and may include, for example, a non-rechargeable (primary) battery, a rechargeable (secondary) battery, or a fuel cell.

The communication module 190 may establish a wired or wireless communication channel between the electronic device 100 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power line communication module) and may communicate with the external electronic device using a corresponding communication module among them through the first network 198 (e.g., the short-range communication network such as a Bluetooth (BT), a Wi-Fi direct, or an infrared data association (IrDA)) or the second network 199 (e.g., the long-distance wireless communication network such as a cellular network, an internet, or a computer network (e.g., LAN or wide area network (WAN)). The above-mentioned various communication modules 190 may be implemented into one chip or into separate chips, respectively.

According to an embodiment, the wireless communication module 192 may identify and authenticate the electronic device 100 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 100 and the external electronic device 104 through the server 108 connected to the second network 199. Each of the electronic devices 102 and 104 may be the same or different types as or from the electronic device 100. According to an embodiment, all or some of the operations performed by the electronic device 100 may be performed by another electronic device or a plurality of external electronic devices. When the electronic device 100 performs some functions or services automatically or by request, the electronic device 100 may request the external electronic device to perform at least some of the functions related to the functions or services, in addition to or instead of performing the functions or services by itself. The external electronic device receiving the request may carry out the requested function or the additional function and transmit the result to the electronic device 100. The electronic device 100 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 100). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

Figure 2:
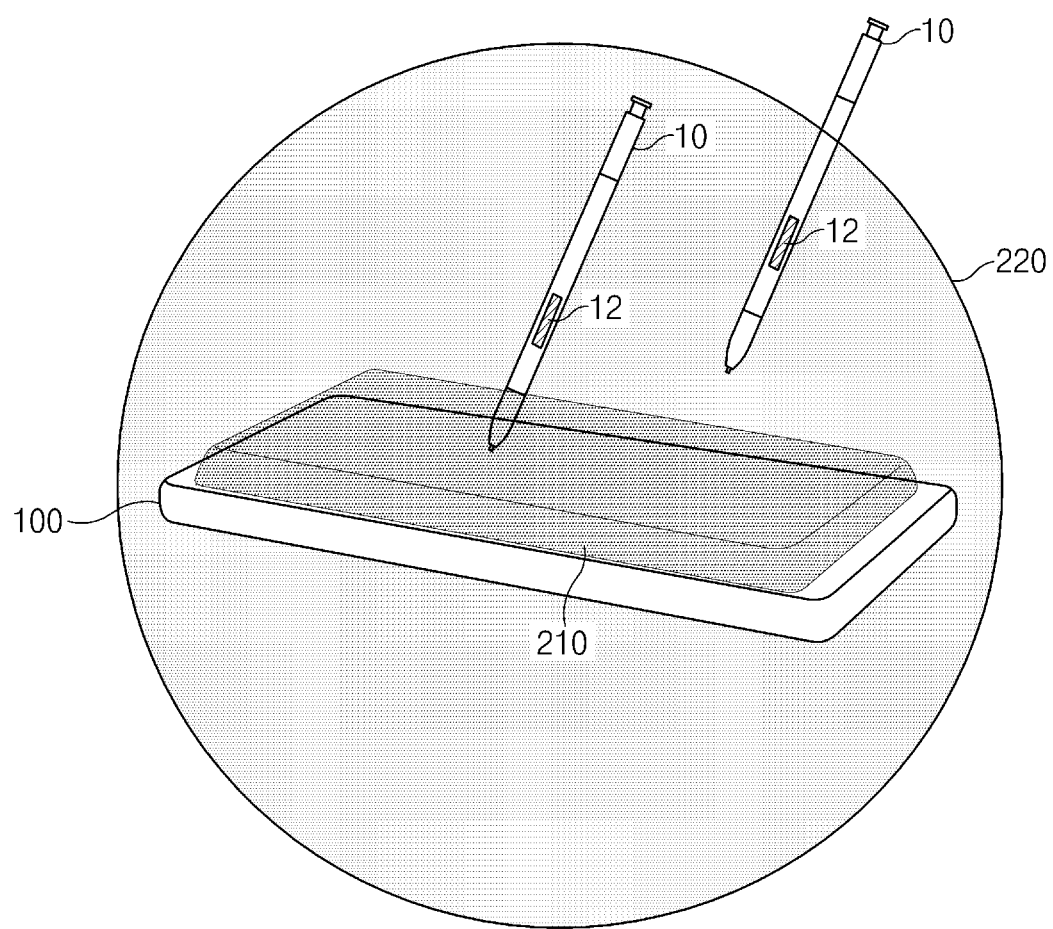
FIG. 2 illustrates an operating environment of an electronic device, according to an embodiment of the disclosure.

FIG. 2 illustrates an operating environment of an electronic device, according to an embodiment of the disclosure.

Referring to FIG. 2, an electronic device 100 may receive a signal from an electronic pen 10. For example, when the electronic pen 10 is placed in a first region 210, the electronic device 100 may receive a first signal from the electronic pen 10. For another example, when the electronic pen 10 is placed in a second region 220, the electronic device 100 may receive a second signal from the electronic pen 10. In the disclosure, the first region 210 may indicate the range (or within a first spaced distance) in which a pen sensing panel 195 can receive the first signal from the electronic pen 10 through the first communication protocol. The second region 220 may indicate the range (or within a second spaced distance) in which the communication module 190 can receive the second signal from the electronic pen 10 through the second communication protocol. Moreover, in the disclosure, the first communication protocol may be referred to as an "electromagnetic resonance (EMR) communication protocol". The second communication protocol may be referred to as "Bluetooth" and "Bluetooth Low Energy (BLE)".

The electronic device 100 may execute a specific function based on a signal received from the electronic pen 10.

In an embodiment, when the user presses a button 12 in a state where the electronic pen 10 is placed in the first region 210, the electronic device 100 may receive the first signal through the pen sensing panel 195. In this case, the electronic device 100 may execute a function defined independently of the application being output through the display 160. For example, when the user presses the button 12 while a camera application is being output through the display 160, the electronic device 100 may output a screen (hereinafter referred to as a "global action") in which a plurality of icons are arranged, through the display 160. Furthermore, when the user presses the button 12 while a gallery application is being output through the display 160, the electronic device 100 may execute the global action. That is, the electronic device 100 may execute a global action regardless of the application output through the display 160.

For another example, when the user presses the button 12 in a state where the electronic pen 10 is placed in the second region 220, the electronic device 100 may receive the second signal through the communication module 190. In this case, the electronic device 100 may execute a function supported by the application output through the display 160. For example, when the user presses the button 12 while the camera application is being output through the display 160, the electronic device 100 may capture a photo. Also, when the user presses the button 12 in a state where the galley application is being output through the display 160, the electronic device 100 may output a photo, not the currently output photo. That is, the electronic device 100 may execute a function mapped to an application output through the display 160.

TABLE 1

Execution app and function according to button press type

| First signal | Second signal | App | Single press | Long press | Double press |
|---|---|---|---|---|---|
| ○ | ○ | Home | Global action | — | — |
|  |  | Camera | Global action | — | — |
|  |  | Gallery | Global action | — | — |
| ○ | X | Home | Global action | — | — |
|  |  | Camera | Global action | — | — |
|  |  | Gallery | Global action | — | — |
| X | ○ | Home | Global action | Shortcut setting | Call action memo |
|  |  | Camera | shutter | Continuous shooting | Capture video |
|  |  | Gallery | Output next image | Shortcut setting | Output previous image |
| X | X | Home | — | — | — |
|  |  | Camera | — | — | — |
|  |  | Gallery | — | — | — |

Table 1 illustrates the application (or app) output through the display 160 and the functions according to how the user presses the button 12. In Table 1, a single press may mean an input method where the user presses the button 12 of the electronic pen 10 once during a short time. A long press may mean an input method where the user presses the button 12 of the electronic pen 10 once during a somewhat long time. A double press may mean an input method where the user continuously presses the button 12 of the electronic pen 10 twice during a short time.

Referring to Table 1, when a single press is entered while the electronic device 100 receives the first signal through the pen sensing panel 195, the electronic device 100 may perform a global action regardless of the application being output through the display 160. That is, the electronic device 100 may output a screen in which a plurality of icons are arranged, on the display 160 while receiving the first signal.

According to an embodiment, when the electronic pen 10 is placed in the first region 210 and both the pen sensing panel 195 and the communication module 190 are turned on, the electronic device 100 may receive both the first and second signals. In this case, the electronic device 100 may ignore the second signal and may perform a specific function based on the first signal. For example, when a single press is input while the electronic device 100 receives the first signal, the electronic device 100 may execute a global action regardless of the application being output through the display 160. In the meantime, when a long press or a double press is entered, the electronic device 100 may not perform any operation.

According to an embodiment, when receiving the second signal through the communication module 190, the electronic device 100 may perform a function corresponding to the application type and a user input method. For example, when a single press is entered in a state where the camera application is being output through the display 160, the electronic device 100 may execute a shutter function. As such, the image output through the display 160 may be captured. For another example, when a long press is entered while the camera application is being output through the display 160, the electronic device 100 may continuously capture the image output through the display 160. For another example, when a double press is entered while the gallery application is output through the display 160, the electronic device 100 may output the image stored before the current image.

In the disclosure, the description given with reference to FIGS. 1 and 2 may be identically applied to components which have the same reference numerals (or marks) as the electronic device 100 illustrated in FIGS. 1 and 2.

Figure 3:
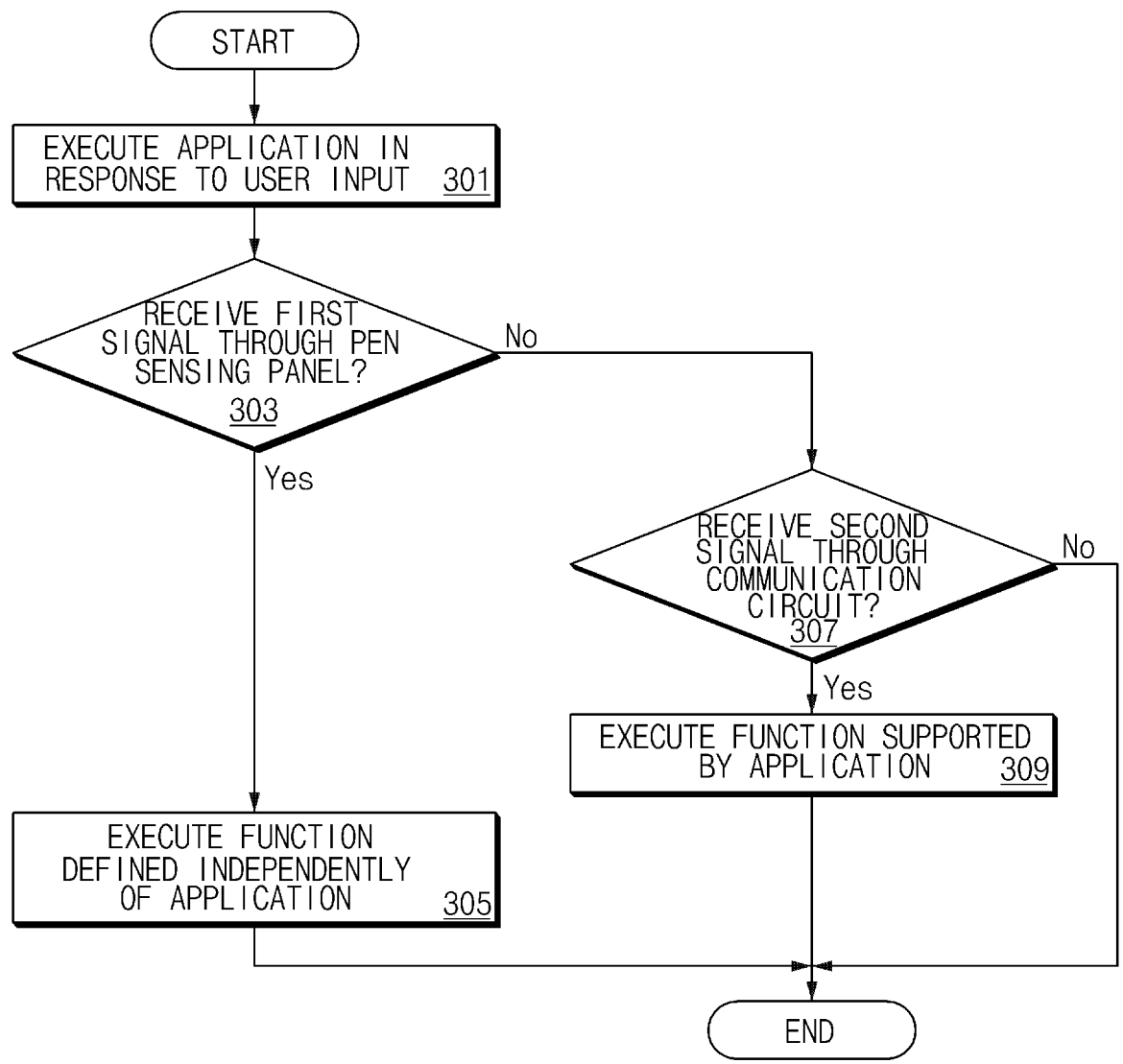
FIG. 3 illustrates an operation flowchart of the electronic device according to an embodiment of the disclosure.

FIG. 3 illustrates an operation flowchart of the electronic device according to an embodiment of the disclosure. FIG. 3 illustrates a flowchart of an operation of the electronic device 100 illustrated in FIG. 1.

Referring to FIG. 3, in operation 301 the electronic device 100 may execute an application in response to a user input. For example, when a user selects a camera icon, the electronic device 100 may execute a camera application. For another example, when the user selects a recording icon, the electronic device 100 may execute a recording application. The application executed in response to the user input in operation 301 may be output through the display 160. Here, the application executed in response to the user input in operation 301 may be one of completely or partially output through the display 160. While it is described herein that the application executed in response to the user input in operation 301 is output through the display 160, the application may alternatively be executed but not output through the display 160.

In operation 303, the electronic device 100 may receive a first signal through the pen sensing panel 195. For example, when the user presses the button 12 in a state where the electronic pen 10 is placed in the first region 210, the electronic device 100 may receive the first signal through the pen sensing panel 195. When receiving the first signal through the pen sensing panel 195, the electronic device 100 may perform operation 305. In contrast, when not receiving the first signal through the pen sensing panel 195, the electronic device 100 may perform operation 307.

In operation 305, the electronic device 100 may execute the function defined independently of an application. For example, when the camera application is being output through the display 160, the electronic device 100 may output a screen in which a plurality of icons are arranged, through the display 160 (or may perform a global action). For another example, when the recording application is being output through the display 160, the electronic device 100 may output a screen in which a plurality of icons are arranged, through the display 160 (or may perform a global action). When the user selects one of the plurality of icons, the electronic device 100 may execute an application or a function corresponding to the selected icon.

In operation 307, the electronic device 100 may receive a second signal through the communication module 190. For example, when the user presses the button 12 in a state where the electronic pen 10 is placed in the second region 220, the electronic device 100 may receive the second signal through the communication module 190. When receiving the second signal through the communication module 190, the electronic device 100 may perform operation 309.

In operation 309, the electronic device 100 may execute the function supported by the application. For example, when the camera application is being output through the display 160, the electronic device 100 may capture a photo. For another example, when the recording application is being output through the display 160, the electronic device 100 may record a voice. Although not shown in FIG. 3, when the electronic device 100 receives the first signal through the pen sensing panel 195 in operation 303, the electronic device 100 may also receive the second signal through the communication module 190. In this case, the electronic device 100 may, similar to operation 305, execute the function defined independently of the application. Further, the operations described herein as operation 305 and operation 309 in FIG. 3 may be switched with each other.

Figure 4A:
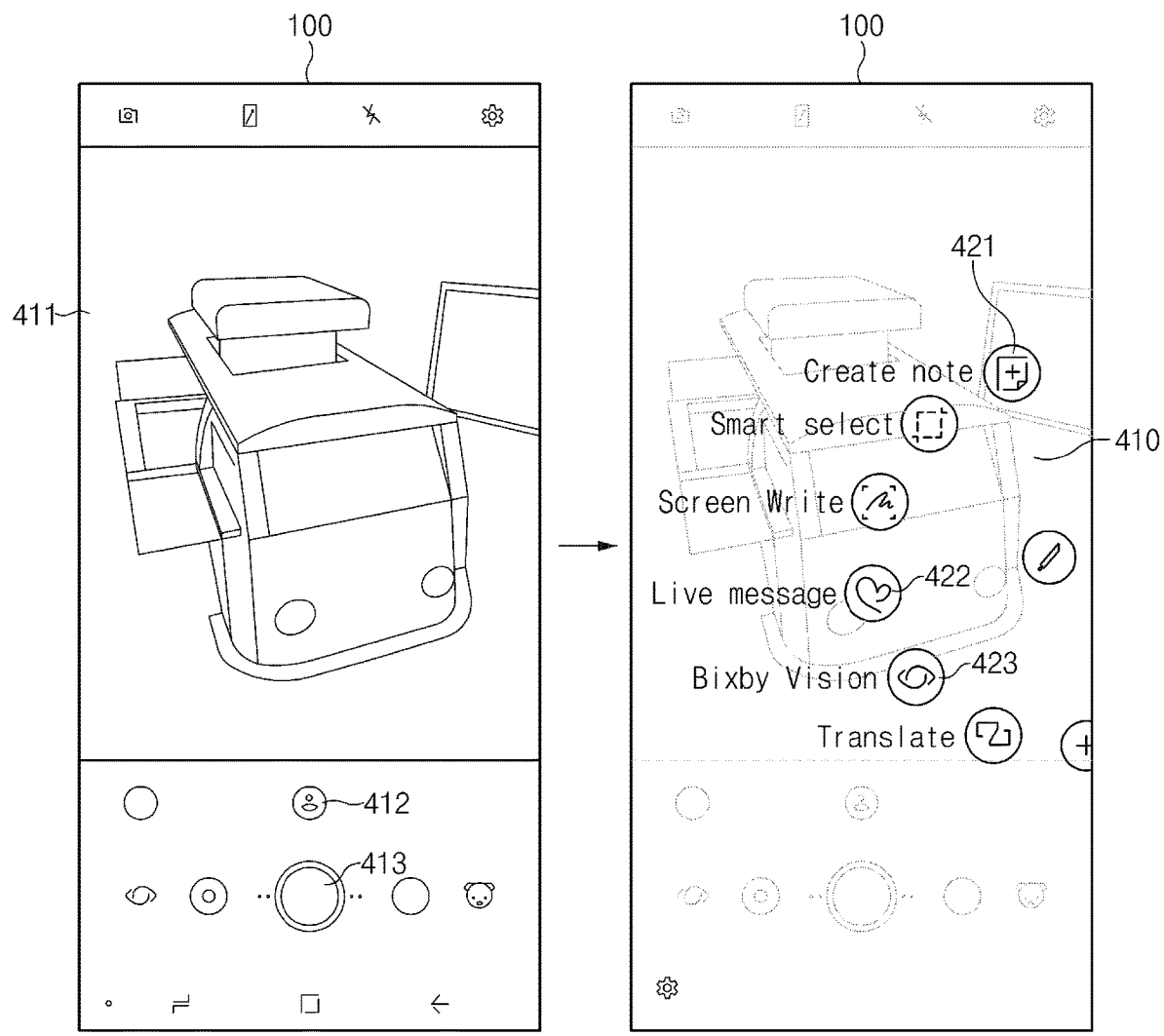
FIG. 4A illustrates an operation state of an electronic device, according to an embodiment of the disclosure.

FIG. 4A illustrates an operation state of an electronic device, according to an embodiment of the disclosure. FIG. 4A is a view for describing operation 305 illustrated in FIG. 3 in detail. That is, FIG. 4A illustrates the operation state of the electronic device 100 when the electronic device 100 receives a first signal through the pen sensing panel 195 in a state where the electronic pen 10 is placed in the first region 210.

Figure 4B:
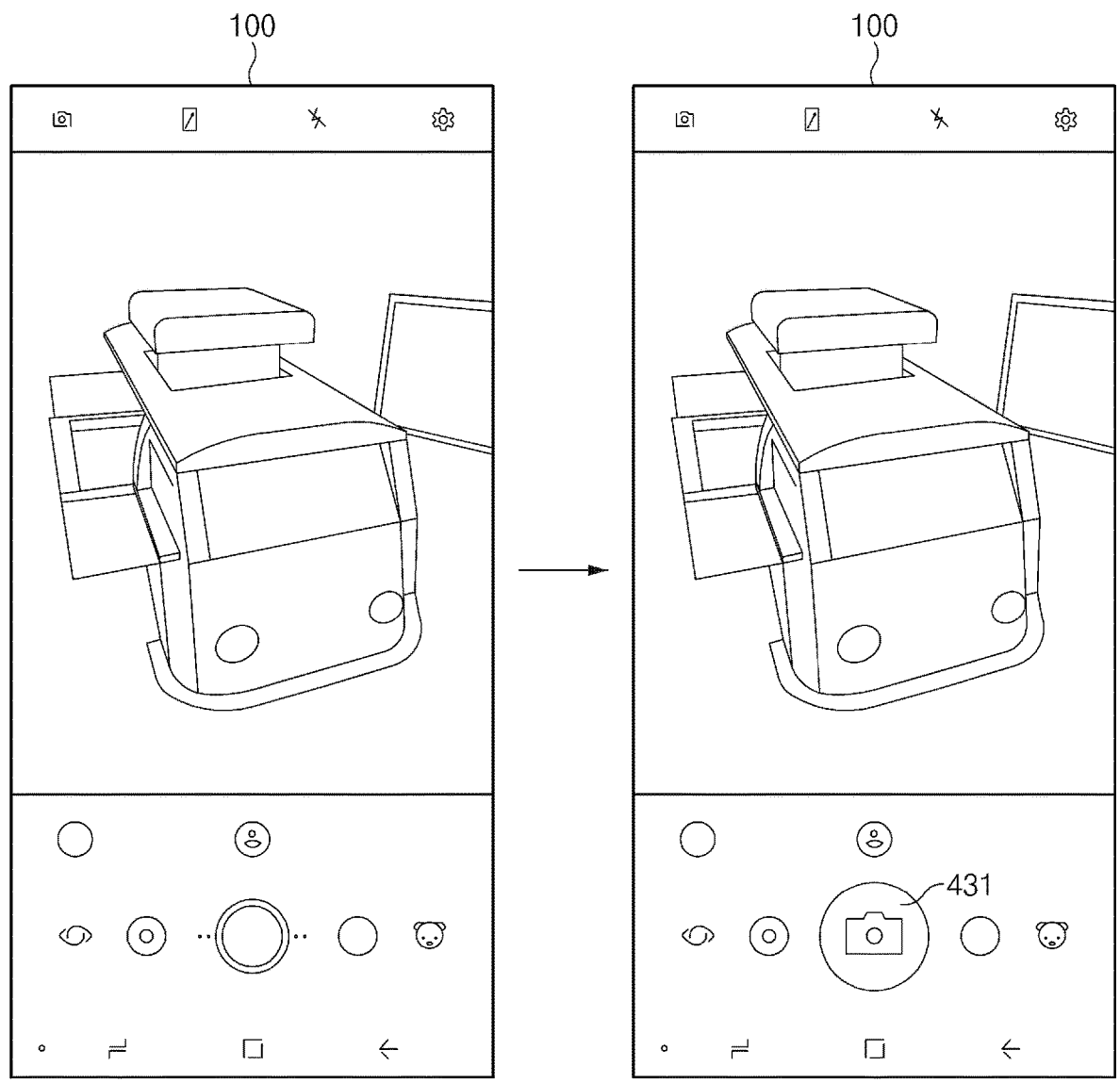
FIG. 4B illustrates an operation state of an electronic device, according to another embodiment of the disclosure.

FIG. 4B illustrates an operation state of an electronic device, according to another embodiment of the disclosure. FIG. 4B is a view for describing operation 309 illustrated in FIG. 3 in detail. That is, FIG. 4B illustrates the operation state of the electronic device 100 when the electronic device 100 receives a second signal through the communication module 190 in a state where the electronic pen 10 is placed in the second region 220.

Referring to FIG. 4A, the electronic device 100 may output the camera application via the display 160 in response to a user input. The camera application execution screen may include an image 411 captured through a camera, and various icons 412 and 413. At this time, when a user presses the button 12 of the electronic pen 10, the electronic device 100 may execute a global action 410. The global action 410 is a function defined independently of the application before the global action is executed; the global action 410 may include an icon 421 which can execute a memo function, a message icon 422, a speech recognition icon 423, and the like. When the user selects a specific icon while the global action 410 is being executed, the electronic device 100 may execute the application or function corresponding to the selected icon.

Referring to FIG. 4B, the electronic device 100 may output the camera application via the display 160 in response to a user input. At this time, when the user presses the button 12 of the electronic pen 10, the electronic device 100 may execute the function mapped to the camera application. For example, when the user presses the button 12 of the electronic pen 10, the electronic device 100 may capture the surrounding environment of the electronic device 100 by executing the function of a shutter 431. That is, in FIG. 4A, when the user presses the button 12, the global action may be executed. However, in FIG. 4B, a function mapped to the application may be executed.

Figure 5A:
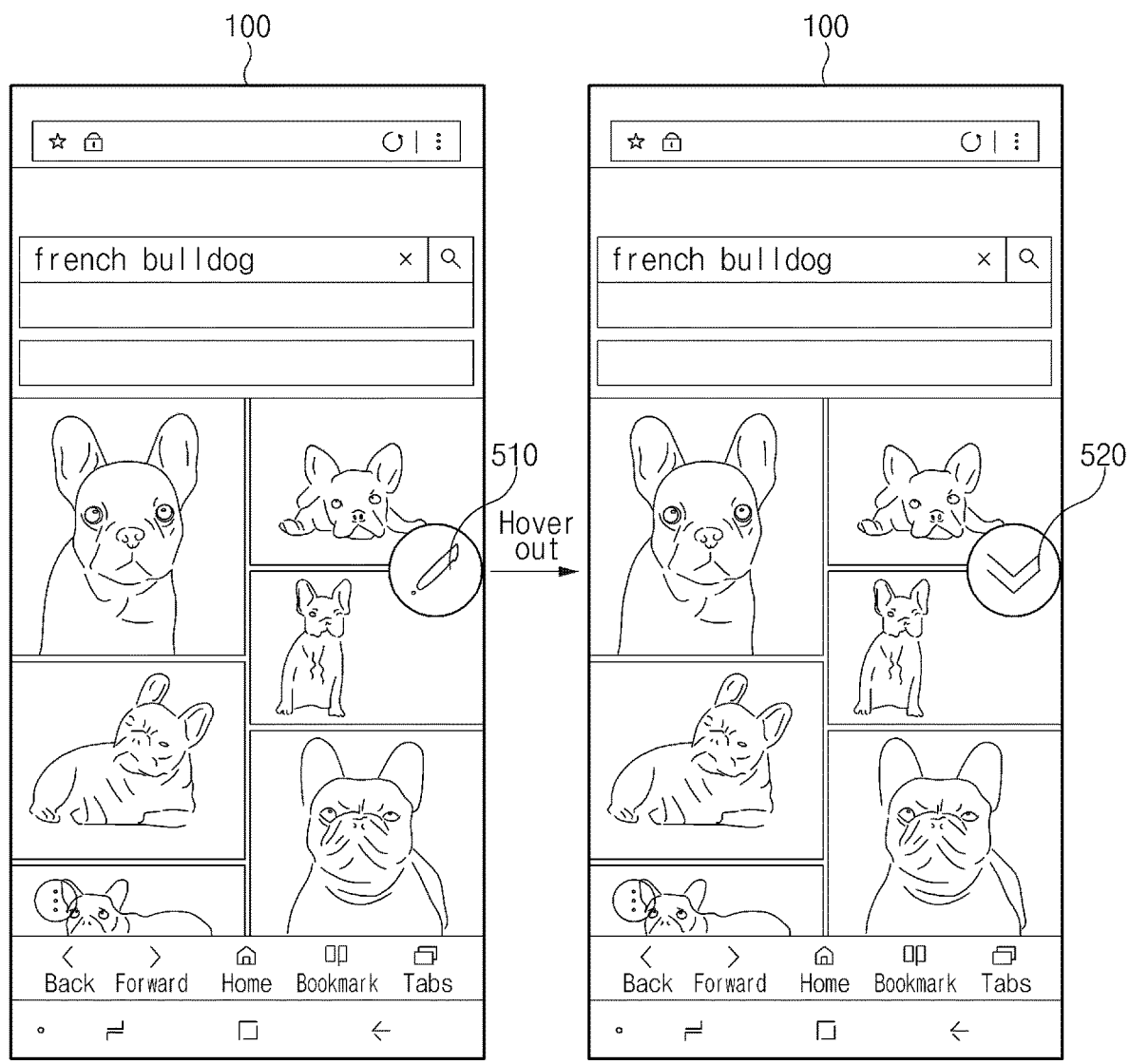
FIG. 5A illustrates an electronic device that outputs different icons, according to an embodiment of the disclosure.

FIG. 5A illustrates an electronic device that outputs different icons, according to an embodiment of the disclosure. FIG. 5A illustrates an electronic device that outputs different icons when the electronic pen 10 moves from the first region 210 to the second region 220 while an Internet browser is being output through the display 160.

Figure 5B:
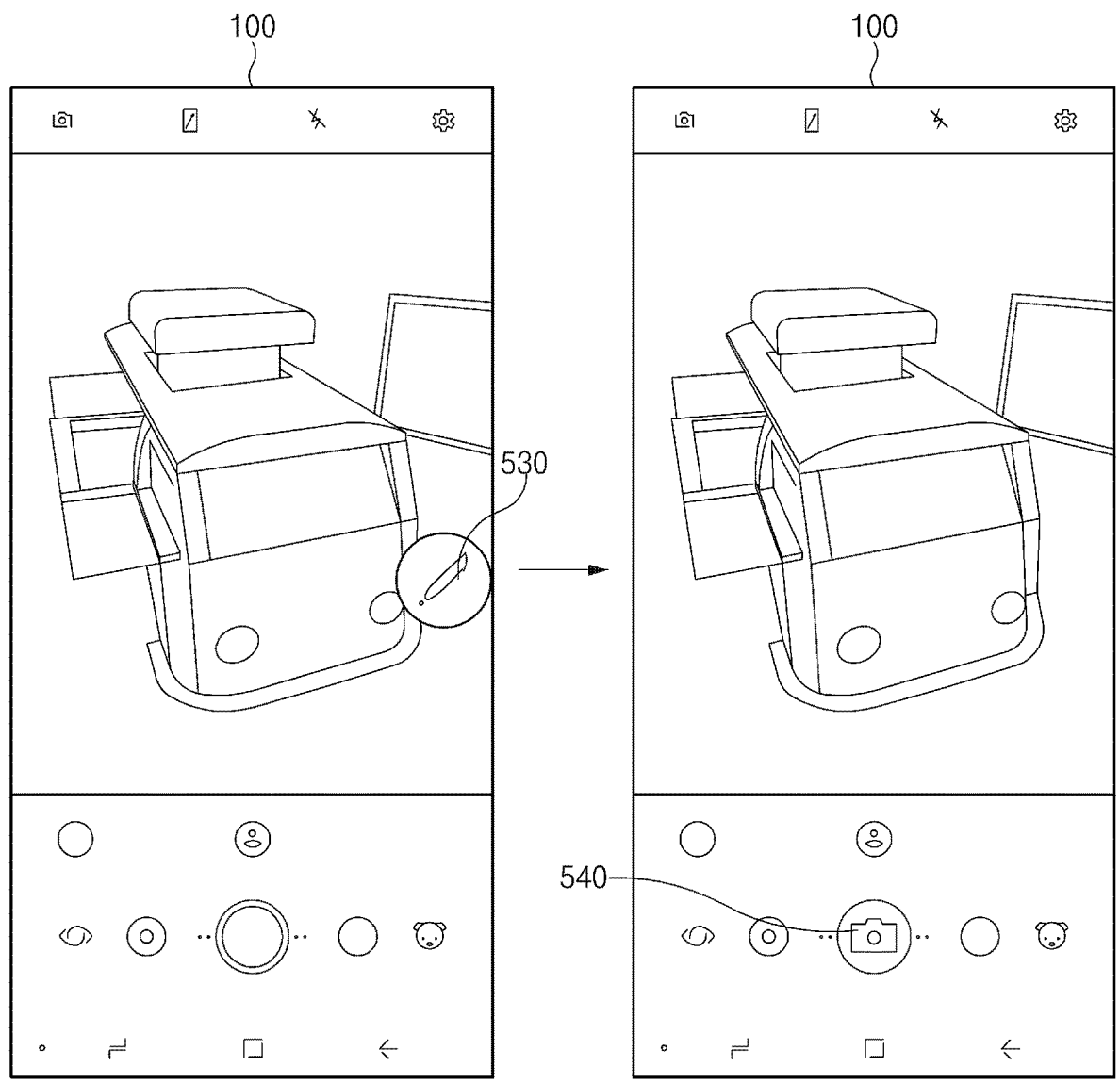
FIG. 5B illustrates an electronic device that outputs different icons, according to another embodiment of the disclosure.

FIG. 5B illustrates an electronic device that outputs different icons, according to another embodiment of the disclosure. FIG. 5B illustrates an electronic device that outputs different icons when the electronic pen 10 moves from the first region 210 to the second region 220 while a camera application is being output through the display 160.

Referring to FIGS. 5A and 5B, the electronic device 100 may detect whether the electronic pen 10 is located in the first region 210 and/or the second region 220. The electronic device 100 may output different icons based on whether the electronic pen 10 is located in the first region 210 and/or the second region 220. For example, when the electronic pen 10 is located in the first region 210, the electronic device 100 may output a global action icon (e.g., 510 or 530) through the display 160. When the user presses the button 12 while the global action icon 510 is being output, the electronic device 100 may execute a global action. In contrast, when the electronic pen 10 is located in the second region 220, the electronic device 100 may output an icon (e.g., 520 or 540) mapped to an application, through the display 160. When the user presses the button 12 while the icon 510 is being output, the electronic device 100 may execute the function mapped to the application.

In the case of FIG. 5A, when the electronic pen 10 is located in the first region 210, the electronic device 100 may output the global action icon 510 through the display 160. When the electronic pen 10 moves from the first region 210 to the second region 220, the electronic device 100 may change the global action icon 510 to the scroll-down icon 520. In contrast, when the electronic pen 10 moves from the second region 220 to the first region 210, the electronic device 100 may change the scroll-down icon 520 to the global action icon 510.

In the case of FIG. 5B, when the electronic pen 10 is located in the first region 210, the electronic device 100 may output the global action icon 530 through the display 160. When the electronic pen 10 moves from the first region 210 to the second region 220, the electronic device 100 may change the global action icon 530 to the shutter icon 540. In contrast, when the electronic pen 10 moves from the second region 220 to the first region 210, the electronic device 100 may change the shutter icon 540 to the global action icon 530.

Figure 6A:
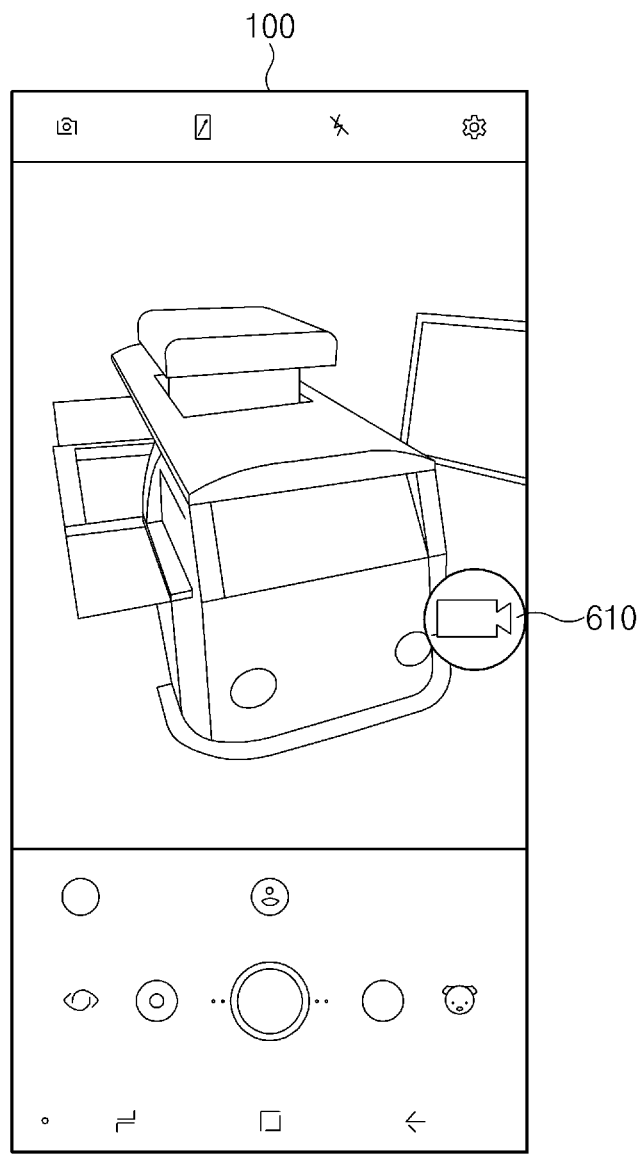
FIG. 6A illustrates a camera application execution screen and an icon mapped to a camera application, according to an embodiment of the disclosure.
Figure 6B:
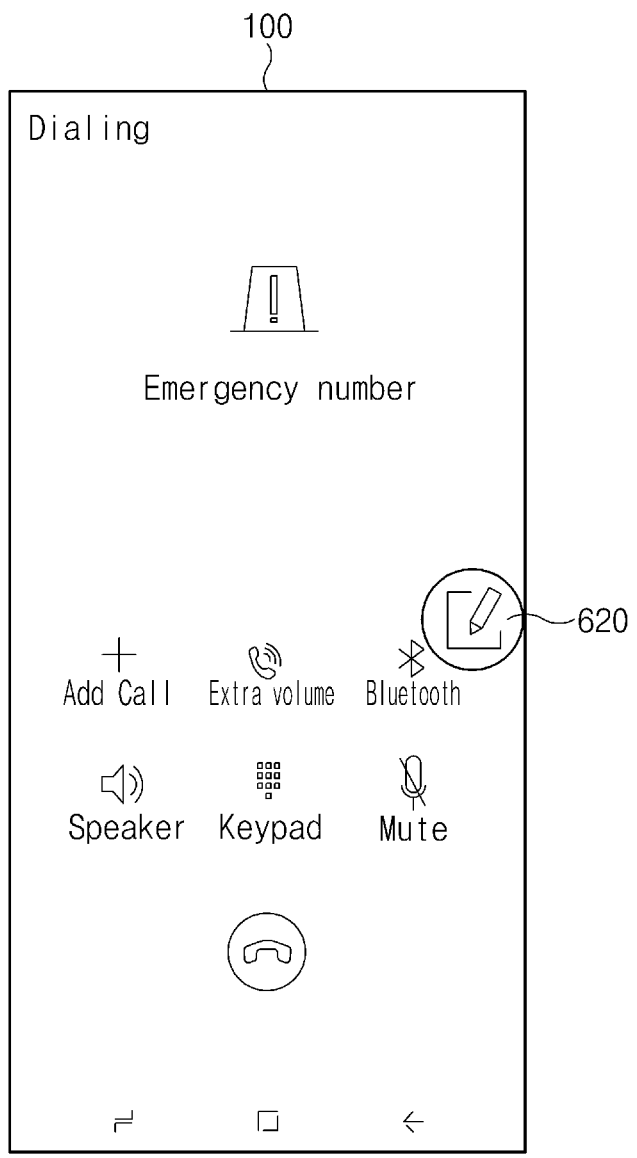
FIG. 6B illustrates a call application execution screen and an icon mapped to a call application, according to an embodiment of the disclosure.
Figure 6C:
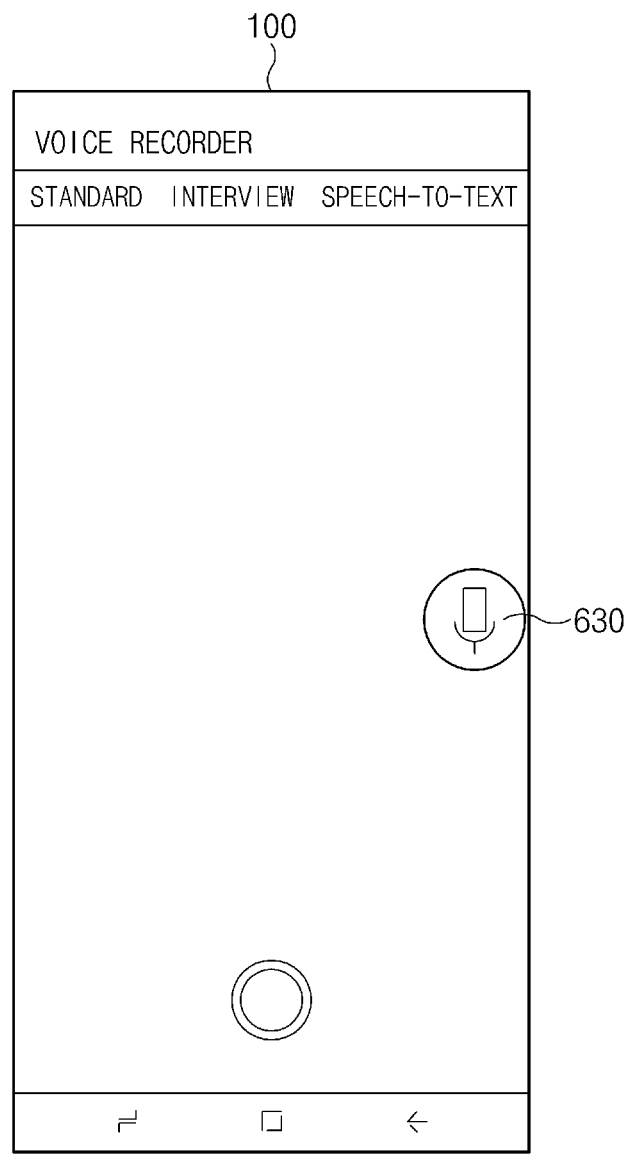
FIG. 6C illustrates a voice recording application execution screen and an icon mapped to a voice recording application, according to an embodiment of the disclosure.
Figure 6D:
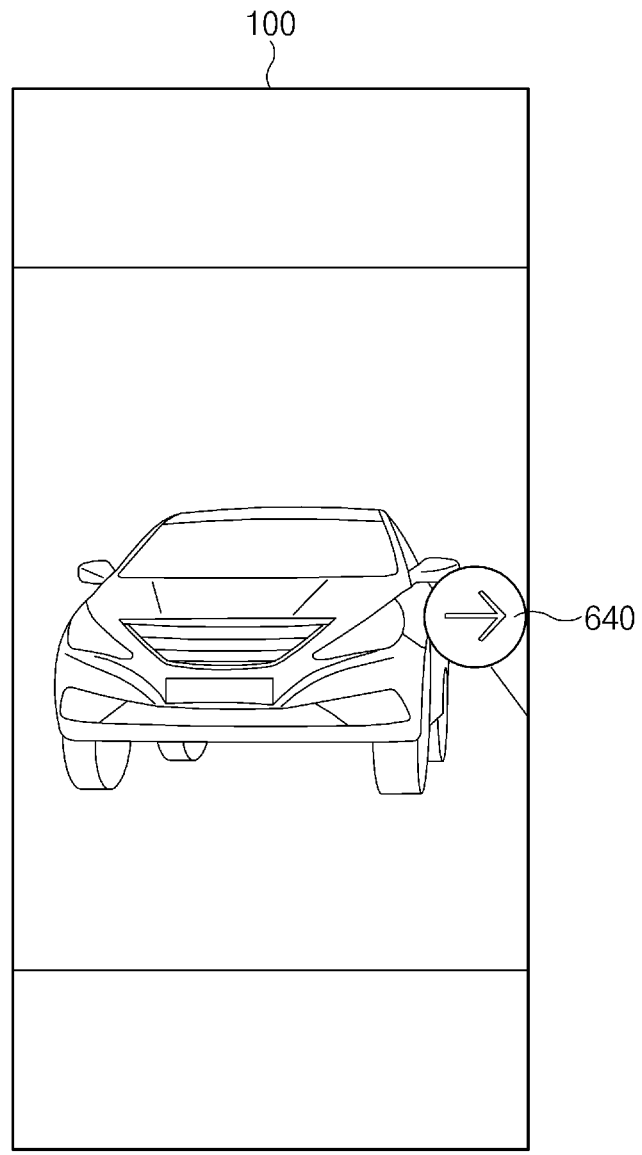
FIG. 6D illustrates a gallery application execution screen and an icon mapped to a gallery application, according to an embodiment of the disclosure.
Figure 6E:
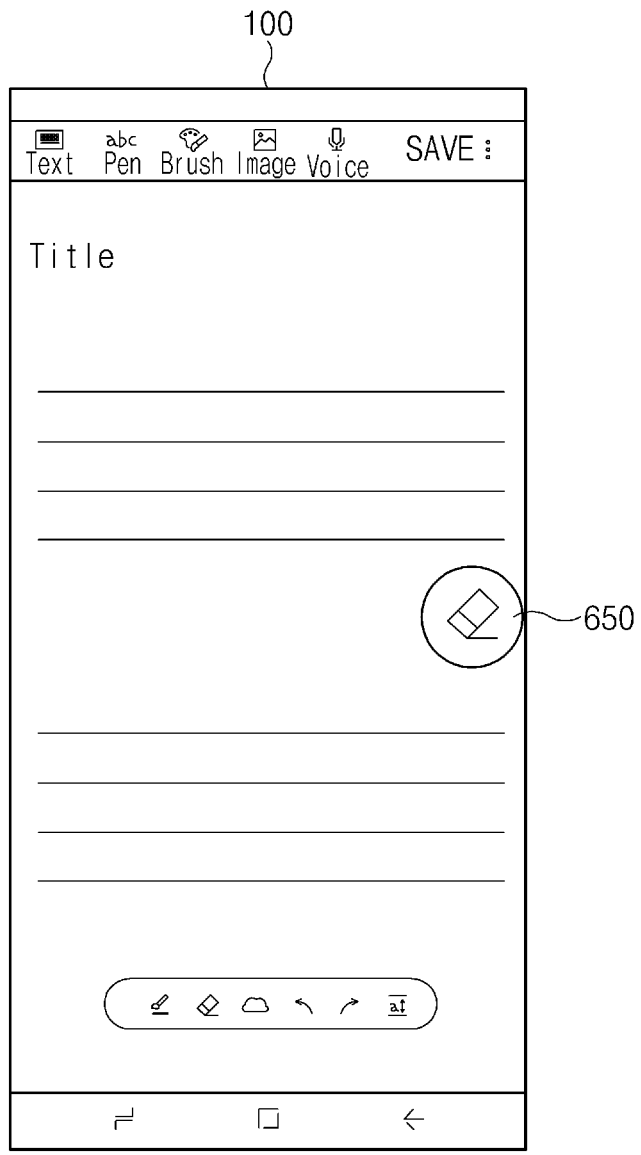
FIG. 6E illustrates a memo application execution screen and an icon mapped to a memo application, according to an embodiment of the disclosure.
Figure 6F:
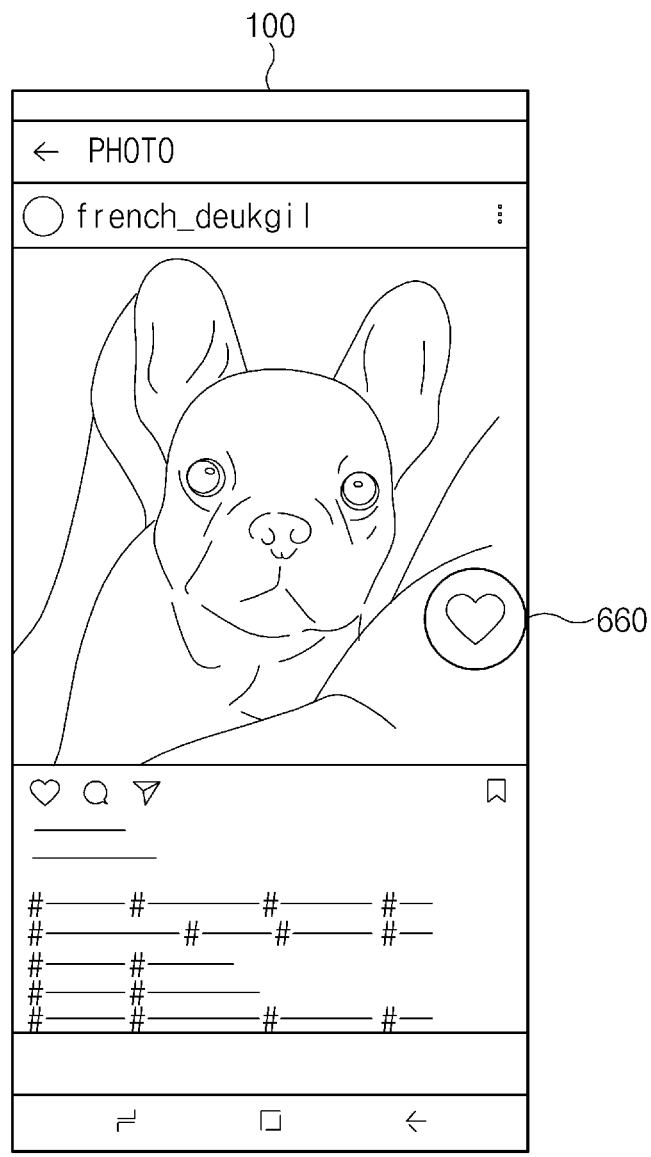
FIG. 6F illustrates a social network service (SNS) application execution screen and an icon mapped to a SNS application, according to an embodiment of the disclosure.

FIG. 6A illustrates a camera application execution screen and an icon mapped to a camera application, according to an embodiment of the disclosure. FIG. 6B illustrates a call application execution screen and an icon mapped to a call application, according to an embodiment of the disclosure. FIG. 6C illustrates a voice recording application execution screen and an icon mapped to a voice recording application, according to an embodiment of the disclosure. FIG. 6D illustrates a gallery application execution screen and an icon mapped to a gallery application, according to an embodiment of the disclosure. FIG. 6E illustrates a memo application execution screen and an icon mapped to a memo application, according to an embodiment of the disclosure. FIG. 6F illustrates a social network service (SNS) application execution screen and an icon mapped to a SNS application, according to an embodiment. FIGS. 6A to 6F illustrate the electronic device 100 outputting an icon mapped with an application while the electronic pen 10 is located in the second region 220.

Referring to FIGS. 6A to 6F, the electronic device 100 may output an icon such that a user intuitively recognizes the function capable of being executed by the electronic device 100, before the user presses the button 12. In the case of 6A, the electronic device 100 may output a video capture icon 610 through the display 160 while the camera application is being executed. At this time, when a user presses the button 12 of the electronic pen 10, the electronic device 100 may capture a video.

In the case of FIG. 6B, the electronic device 100 may output a memo icon 620 through the display 160 while the call application is being executed. At this time, when a user presses the button 12 of the electronic pen 10, the electronic device 100 may output a memo field. The user may write the content of the telephone conversation in the memo field while talking to another user.

In the case of FIG. 6C, the electronic device 100 may output a recording icon 630 through the display 160 while the voice recording application is being executed. At this time, when the user presses the button 12 of the electronic pen 10, the electronic device 100 may execute a recording function.

In the case of FIG. 6D, the electronic device 100 may output a next page icon 640 through the display 160 while the gallery application is being executed. At this time, when the user presses the button 12 of the electronic pen 10, the electronic device 100 may output the image stored next to the currently output image.

In the case of FIG. 6E, the electronic device 100 may output an eraser icon 650 through the display 160 while the memo application is being executed. At this time, when the user presses the button 12 of the electronic pen 10, the electronic device 100 may delete the text placed in a region where the electronic pen 10 is located.

In the case of FIG. 6F, the electronic device 100 may output a recommendation icon 660 through the display 160 while the SNS application is being executed. At this time, when the user presses the button 12 of the electronic pen 10, the electronic device 100 may output a list of users who have recommended the photo.

According to an embodiment of the disclosure, an electronic device may include a display, a pen sensing panel disposed inside the display or on a rear surface of the display and receiving a first signal from an electronic pen through a first communication protocol, a communication circuit receiving a second signal from the electronic pen through a second communication protocol, a memory storing at least one application, and a processor electrically connected to the display, the pen sensing panel, the communication circuit, and the memory. The processor may be configured to execute the at least one application in response to a user input, when the first signal is received through the pen sensing panel while the at least one application is output through the display, to execute a function defined independently of the at least one application, and when the first signal is not received through the pen sensing panel but the second signal is received through the communication circuit while the at least one application is output through the display, to execute a function supported by the at least one application.

According to an embodiment of the disclosure, the first signal and the second signal may be generated by a pressure applied to a button included in the electronic pen.

According to an embodiment of the disclosure, when both the first signal and the second signal are received while the at least one application is displayed through the display, the processor may be configured to execute the function defined independently of the at least one application.

According to an embodiment of the disclosure, when the electronic pen is within a first spaced distance from the electronic device, the pen sensing panel may be configured to receive the first signal.

According to an embodiment of the disclosure, the processor may be configured to output an icon for executing the function defined independently of the at least one application.

According to an embodiment of the disclosure, when the electronic pen is within a second spaced distance from the electronic device, which is further than the first spaced distance from the electronic device, the communication circuit may be configured to receive the second signal.

According to an embodiment of the disclosure, when the electronic pen is located at a location, which is further than the first spaced distance and which is closer than the second spaced distance, the processor may be configured to output an icon for executing the function supported by the at least one application.

According to an embodiment of the disclosure, when the electronic pen is located further than the second spaced distance from the electronic device, the pen sensing panel and the communication circuit may not receive the first signal and the second signal.

According to an embodiment of the disclosure, the first communication protocol may correspond to an electromagnetic resonance (EMR) communication protocol, and the second communication protocol may correspond to one of Bluetooth or Bluetooth Low Energy (BLE).

According to an embodiment of the disclosure, the electronic device may further include a slot into which the electronic pen is inserted inside the electronic device.

According to an embodiment of the disclosure, an electronic device may include a display, a pen sensing panel disposed inside the display or on a rear surface of the display and sensing whether an electronic pen is located in a first region, a communication circuit detecting whether the electronic pen is located in a second region, which includes the first region and a remaining region which is greater than the first region, a memory storing at least one application, and a processor electrically connected to the display, the pen sensing panel, the communication circuit, and the memory. The processor may be configured to execute the at least one application in response to a user input, when the electronic pen is located in the first region, to output a first icon for executing a function defined independently of the at least one application, on the display, and when the electronic pen is located the remaining region, to output a second icon for executing a function supported by the at least one application, on the display.

According to an embodiment of the disclosure, when a user applies a pressure of a specific magnitude or more to a button mounted on the electronic pen in a state where the electronic pen is located in the first region, the processor may be configured to execute the function defined independently of the application.

According to an embodiment of the disclosure, when the user applies the pressure of the specific magnitude or more to the button mounted on the electronic pen in the state where the electronic pen is located in the first region, the pen sensing panel may receive a signal for executing the function defined independently of the application, from the electronic pen.

According to an embodiment of the disclosure, when the user applies the pressure of the specific magnitude or more to the button mounted on the electronic pen in the state where the electronic pen is located in the first region, the processor may be configured to output a screen in which specified icons are arranged, through the display.

According to an embodiment of the disclosure, when a user applies a pressure of a specific magnitude or more to a button mounted on the electronic pen in a state where the electronic pen is located in the remaining region, the processor may be configured to execute the function supported by the application.

According to an embodiment of the disclosure, when the user applies the pressure of the specific magnitude or more to the button mounted on the electronic pen in the state where the electronic pen is located in the remaining region, the communication circuit may receive a signal for executing the function supported by the application, from the electronic pen.

According to an embodiment of the disclosure, when the electronic pen moves from the first region to the remaining region, the processor may be configured to change the first icon to the second icon.

According to an embodiment of the disclosure, when the electronic pen moves from the remaining region to the first region, the processor may be configured to change the second icon to the first icon.

According to an embodiment of the disclosure, when the electronic pen is located out of the second region, the processor may not output the first icon and the second icon.

According to an embodiment of the disclosure, the electronic device may further include a slot into which the electronic pen is inserted inside the electronic device.

According to various embodiments of the disclosure, various functions may be executed through an electronic pen.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a pen sensing panel disposed inside the display or on a rear surface of the display and configured to receive a first signal from an electronic pen through a first communication protocol;
   a communication circuit configured to receive a second signal from the electronic pen through a second communication protocol;
   a memory configured to store at least one application; and
   at least one processor electrically connected to the display, the pen sensing panel, the communication circuit, and the memory,
   wherein the at least one processor is configured to:
      execute the at least one application in response to a user input,
      when the first signal is received through the pen sensing panel while the at least one application is displayed through the display, execute a function defined independently of the at least one application, and
      when the first signal is not received through the pen sensing panel and the second signal is received through the communication circuit while the at least one application is displayed through the display, execute a function supported by the at least one application, and
   wherein the at least one processor is further configured to:
      in response to executing the function defined independently of the at least one application, output at least one executable icon included in the function defined independently of the at least one application, each executable icon corresponding to a different application or function.

2. The electronic device of claim 1, wherein the first signal and the second signal are generated by a pressure applied to a button included in the electronic pen.

3. The electronic device of claim 1, wherein the at least one processor is further configured to:
   when both the first signal and the second signal are received while the at least one application is displayed through the display, execute the function defined independently of the at least one application.

4. The electronic device of claim 1, wherein the pen sensing panel is further configured to:
   when the electronic pen is within a first spaced distance from the electronic device, receive the first signal.

5. The electronic device of claim 4, wherein the communication circuit is further configured to:
   when the electronic pen is within a second spaced distance from the electronic device, which is further than the first spaced distance from the electronic device, receive the second signal.

6. The electronic device of claim 5, wherein the at least one processor is further configured to:
   when the electronic pen is located at a location, which is further than the first spaced distance and which is closer than the second spaced distance, output an icon for executing the function supported by the at least one application.

7. The electronic device of claim 5, wherein, when the electronic pen is located further than the second spaced distance from the electronic device, the pen sensing panel and the communication circuit do not receive the first signal and the second signal.

8. The electronic device of claim 1,
   wherein the first communication protocol corresponds to an electromagnetic resonance (EMR) communication protocol, and
   wherein the second communication protocol corresponds to one of Bluetooth or Bluetooth Low Energy (BLE).

9. The electronic device of claim 1, further comprising:
   a slot into which the electronic pen is inserted inside the electronic device.

10. An electronic device comprising:
    a display;
    a pen sensing panel disposed inside the display or on a rear surface of the display and configured to sense whether an electronic pen is located in a first region;
    a communication circuit configured to detect whether the electronic pen is located in a second region, which includes the first region and a remaining region which is greater than the first region;
    a memory configured to store at least one application; and
    at least one processor electrically connected to the display, the pen sensing panel, the communication circuit, and the memory,
    wherein the at least one processor is configured to:
       execute the at least one application in response to a user input,
       when the electronic pen is located in the first region, display a first icon for executing a function defined independently of the at least one application, on the display, and
       when the electronic pen is located the remaining region, display a second icon for executing a function supported by the at least one application, on the display.

11. The electronic device of claim 10, wherein the at least one processor is further configured to:
    when a user applies a pressure of a specific magnitude or more to a button mounted on the electronic pen in a state where the electronic pen is located in the first region, execute the function defined independently of the application.

12. The electronic device of claim 11, wherein, when the user applies the pressure of the specific magnitude or more to the button mounted on the electronic pen in the state where the electronic pen is located in the first region, the pen sensing panel receives a signal for executing the function defined independently of the application, from the electronic pen.

13. The electronic device of claim 11, wherein the at least one processor is further configured to:
when the user applies the pressure of the specific magnitude or more to the button mounted on the electronic pen in the state where the electronic pen is located in the first region, output a screen in which specified icons are arranged, through the display.

14. The electronic device of claim 10, wherein the at least one processor is further configured to:
when a user applies a pressure of a specific magnitude or more to a button mounted on the electronic pen in a state where the electronic pen is located in the remaining region, execute the function supported by the application.

15. The electronic device of claim 14, wherein, when the user applies the pressure of the specific magnitude or more to the button mounted on the electronic pen in the state where the electronic pen is located in the remaining region, the communication circuit receives a signal for executing the function supported by the application, from the electronic pen.

16. The electronic device of claim 10, wherein the at least one processor is further configured to:
when the electronic pen moves from the first region to the remaining region, change the first icon to the second icon.

17. The electronic device of claim 10, wherein the at least one processor is further configured to:
when the electronic pen moves from the remaining region to the first region, change the second icon to the first icon.

18. The electronic device of claim 10, wherein, when the electronic pen is located out of the second region, the at least one processor does not output the first icon and the second icon.

19. The electronic device of claim 10, further comprising:
a slot into which the electronic pen is inserted inside the electronic device.

* * * * *